United States Patent
Qi et al.

(10) Patent No.: US 12,000,634 B2
(45) Date of Patent: Jun. 4, 2024

(54) GAS-LIQUID SEPARATION DEVICE

(71) Applicant: HANGZHOU SANHUA RESEARCH INSTITUTE CO., LTD., Hangzhou (CN)

(72) Inventors: Zhaogang Qi, Hangzhou (CN); Chunyu Shao, Hangzhou (CN); Linjie Huang, East Amherst, NY (US)

(73) Assignee: ZHEJIANG SANHUA INTELLIGENT CONTROLS CO., LTD., Shaoxing (CN)

( * ) Notice: Subject to any disclaimer, the term of this patent is extended or adjusted under 35 U.S.C. 154(b) by 447 days.

(21) Appl. No.: 17/437,408

(22) PCT Filed: Mar. 11, 2020

(86) PCT No.: PCT/CN2020/078711
§ 371 (c)(1),
(2) Date: Sep. 8, 2021

(87) PCT Pub. No.: WO2020/187102
PCT Pub. Date: Sep. 24, 2020

(65) Prior Publication Data
US 2022/0163245 A1    May 26, 2022

(30) Foreign Application Priority Data
Mar. 15, 2019  (CN) .......................... 201910198325.8

(51) Int. Cl.
*F25B 43/00*    (2006.01)

(52) U.S. Cl.
CPC ........ *F25B 43/006* (2013.01); *F25B 2500/28* (2013.01)

(58) Field of Classification Search
CPC . F25B 43/006; F25B 2500/28; B01D 19/0057
See application file for complete search history.

(56) References Cited

U.S. PATENT DOCUMENTS

| | | | | |
|---|---|---|---|---|
| 1,661,685 A | * | 3/1928 | Walker | B01D 19/0057 96/211 |
| 1,752,215 A | * | 3/1930 | Waters | B01D 19/0057 96/188 |

(Continued)

FOREIGN PATENT DOCUMENTS

| | | |
|---|---|---|
| CN | 103604254 A | 2/2014 |
| CN | 104457038 A | 3/2015 |

(Continued)

*Primary Examiner* — Eric S Ruppert
*Assistant Examiner* — Kirstin U Oswald
(74) *Attorney, Agent, or Firm* — Cheng-Ju Chiang

(57) ABSTRACT

A gas-liquid separation device includes a cylinder, an external port, an adapter, and a gas-liquid separation component. The cylinder has a first cavity, a second cavity, and a third cavity. The external port includes a first port, a second port, and a third port. The adapter is at least partially disposed in the cylinder. The gas-liquid separation component is located in the third cavity. When the gas-liquid separation device is in a first working state, the adapter separates the third port from the third cavity, the first port serves as the inlet, and the second port serves as the outlet when the gas-liquid separation device is in a second working state, the adapter communicates the third port with the third cavity, the second port serves as an inlet, and the first port and the third port serve as outlets. The gas-liquid separation component separates gas-liquid two-phase refrigerant.

20 Claims, 11 Drawing Sheets

(56) References Cited

U.S. PATENT DOCUMENTS

| | | | | |
|---|---|---|---|---|
| 1,863,111 A | * | 6/1932 | Greve | B01D 19/0057 96/216 |
| 2,016,641 A | * | 10/1935 | Lincoln | B01D 19/0057 96/191 |
| 2,163,095 A | * | 6/1939 | Kopp | B01D 19/0057 96/188 |
| 2,229,860 A | * | 1/1941 | McCurdy | B01D 21/0012 55/395 |
| 2,300,129 A | * | 10/1942 | McCurdy | B01D 21/0045 210/512.1 |
| 2,343,682 A | * | 3/1944 | McCurdy | B01D 21/0054 210/512.1 |
| 4,757,696 A | * | 7/1988 | Gannaway | F25B 43/006 62/503 |
| 7,891,201 B1 | * | 2/2011 | Bush | F25B 9/008 62/115 |
| 2011/0174014 A1 | * | 7/2011 | Scarcella | F25B 9/008 62/512 |
| 2011/0247309 A1 | * | 10/2011 | Smith | B04B 7/12 55/447 |
| 2012/0297986 A1 | * | 11/2012 | Suda | G01F 15/08 96/157 |

FOREIGN PATENT DOCUMENTS

| | | |
|---|---|---|
| CN | 204630193 U | 9/2015 |
| CN | 105241134 A | 1/2016 |
| CN | 204963284 U | 1/2016 |
| CN | 205002455 U | 1/2016 |
| CN | 106196776 A | 12/2016 |
| CN | 107965941 A | 4/2018 |
| CN | 109405372 A | 3/2019 |
| JP | 2003-314928 A | 11/2003 |
| JP | 2014-156848 A | 8/2014 |
| KR | 10-2013-0057548 A | 6/2013 |

* cited by examiner

GAS-LIQUID SEPARATION DEVICE

CROSS-REFERENCE TO RELATED APPLICATION

This application is a 35 U.S.C. § 371 National Phase conversion of International (PCT) Patent Application No. PCT/CN2020/078711, filed on Mar. 11, 2020, which claims priority of a Chinese Patent Application No. 201910198325.8, filed on Mar. 15, 2019 and titled "GAS-LIQUID SEPARATION DEVICE", the entire content of which is incorporated into this application herein by reference. The PCT International Patent Application was filed and published in Chinese.

TECHNICAL FIELD

The present disclosure relates to a field of air conditioning technology, in particular to a gas-liquid separation device.

BACKGROUND

The gas-liquid separation device in the conventional automotive air-conditioning heat pump system is disposed between an outlet of an outdoor heat exchanger of an automotive air conditioner and an inlet of a compressor, which is mainly to prevent the phenomenon of "liquid strike" and to filter and dry the refrigerant. Moreover, the gas-liquid separation device usually has only one inlet and one outlet.

SUMMARY

According to a first aspect of the embodiments of the present disclosure, a gas-liquid separation device is provided. The gas-liquid separation device includes:
- a cylinder, the cylinder defining a first cavity, a second cavity and a third cavity, the first cavity being in communication with the second cavity, the second cavity being in communication with the third cavity;
- an external port, the external port comprising a first port, a second port and a third port, the first port being in communication with the first cavity, the second port being in communication with the second cavity;
- an adapter, the adapter being at least partially disposed in the cylinder, the adapter defining a first channel and a second channel, a lower end of the second channel and a lower end of the first channel being both located in the third cavity, the lower end of the second channel being lower than the lower end of the first channel, the second channel being in communication with the first cavity and the third cavity, the third port being selectively in communication with or not in communication with the third cavity through the first channel; and
- a gas-liquid separation component, the gas-liquid separation component being located in the third cavity, and being adapted to separate a gas-liquid two-phase refrigerant that enters the third cavity from the second cavity;

wherein when the gas-liquid separation device is in a first working state, the first channel is closed so that the third port is not in communication with the third cavity; the first port serves as an inlet, and the second port serves as an outlet;

when the gas-liquid separation device is in a second working state, the first channel is opened so that the third port is in communication with the third cavity; the second port serves as an inlet, the first port being in communication with the second channel serves as an outlet for a liquid-phase refrigerant after being separated, and the third port being in communication with the first channel serves as an outlet of a gas-phase refrigerant after being separated; or, the first port serves as an inlet, the second port serves as an outlet for the liquid-phase refrigerant or an outlet for the gas-liquid two-phase refrigerant, and the third port being in communication with the first channel serves as an outlet for the gas-phase refrigerant after being separated.

It can be seen from the above technical solution that the gas-liquid separation device provided by the present disclosure has three ports, which can realize two working states of one in and one out, and one in and two out. The gas-liquid separation device can be applied to applications of different working modes of the air conditioning system, such as a cooling mode and a heating mode.

DETAILED DESCRIPTION

Figure 1:
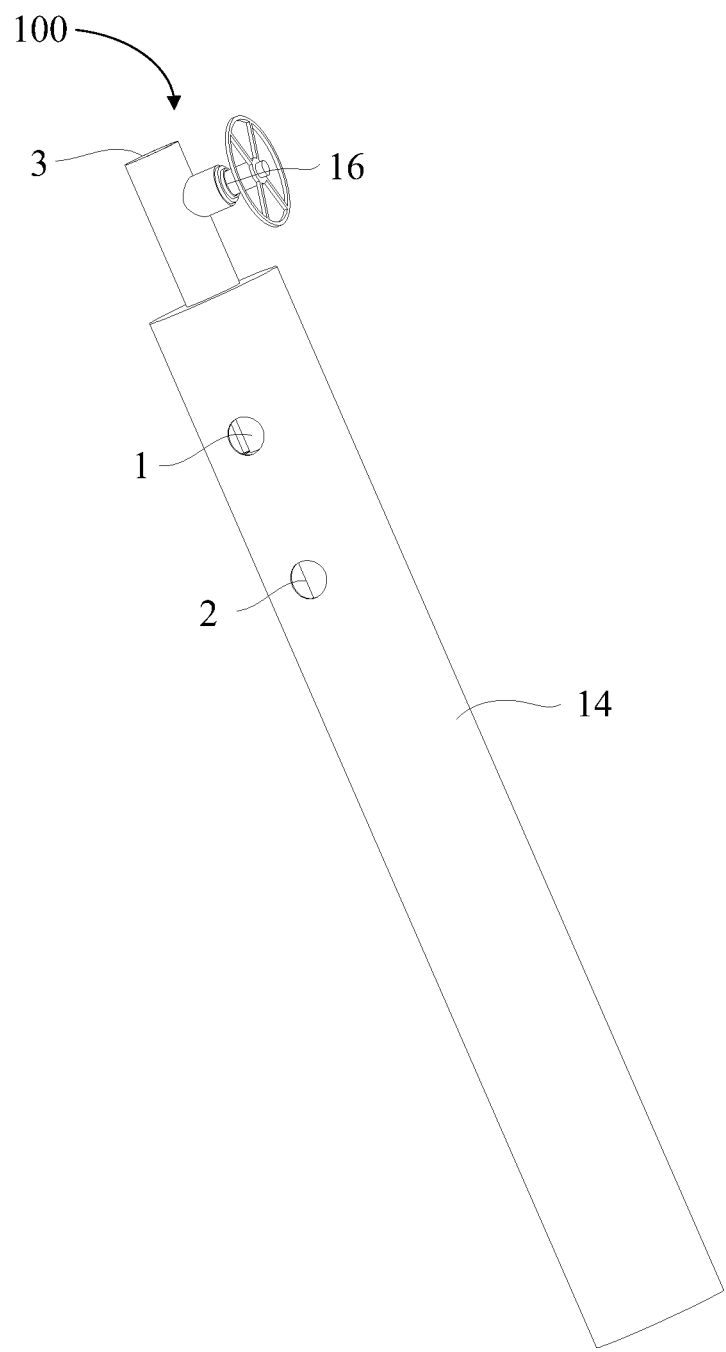
FIG. 1 is a schematic perspective structural view of a gas-liquid separation device in accordance with an exemplary embodiment of the present disclosure.
Figure 2:
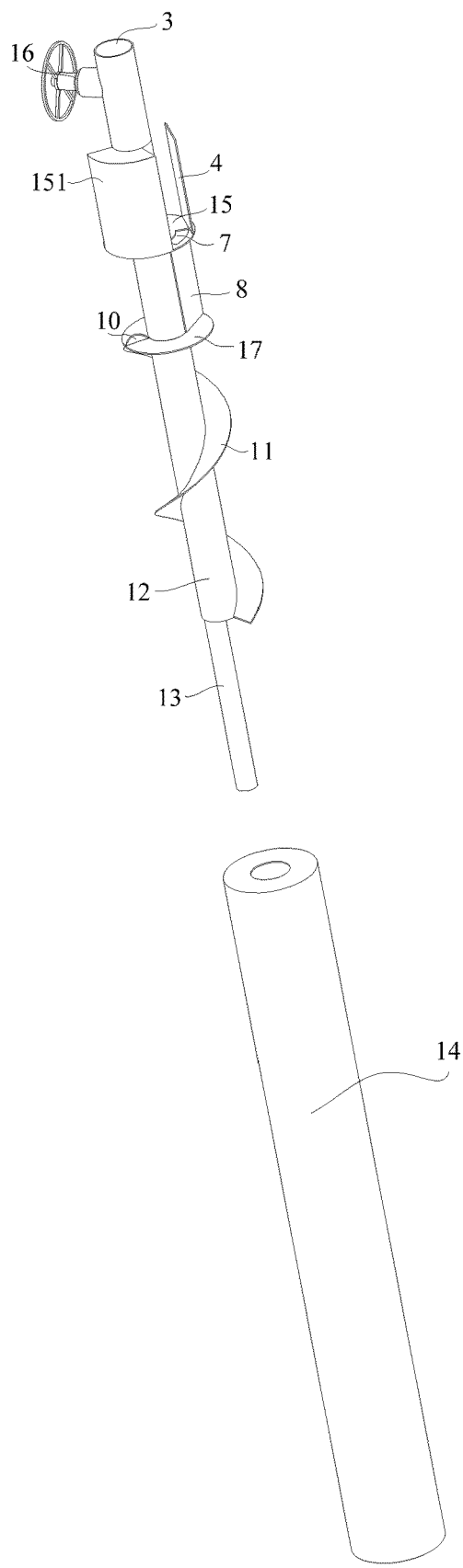
FIG. 2 is an exploded view of the gas-liquid separation device shown in FIG. 1 from a perspective.
Figure 3:
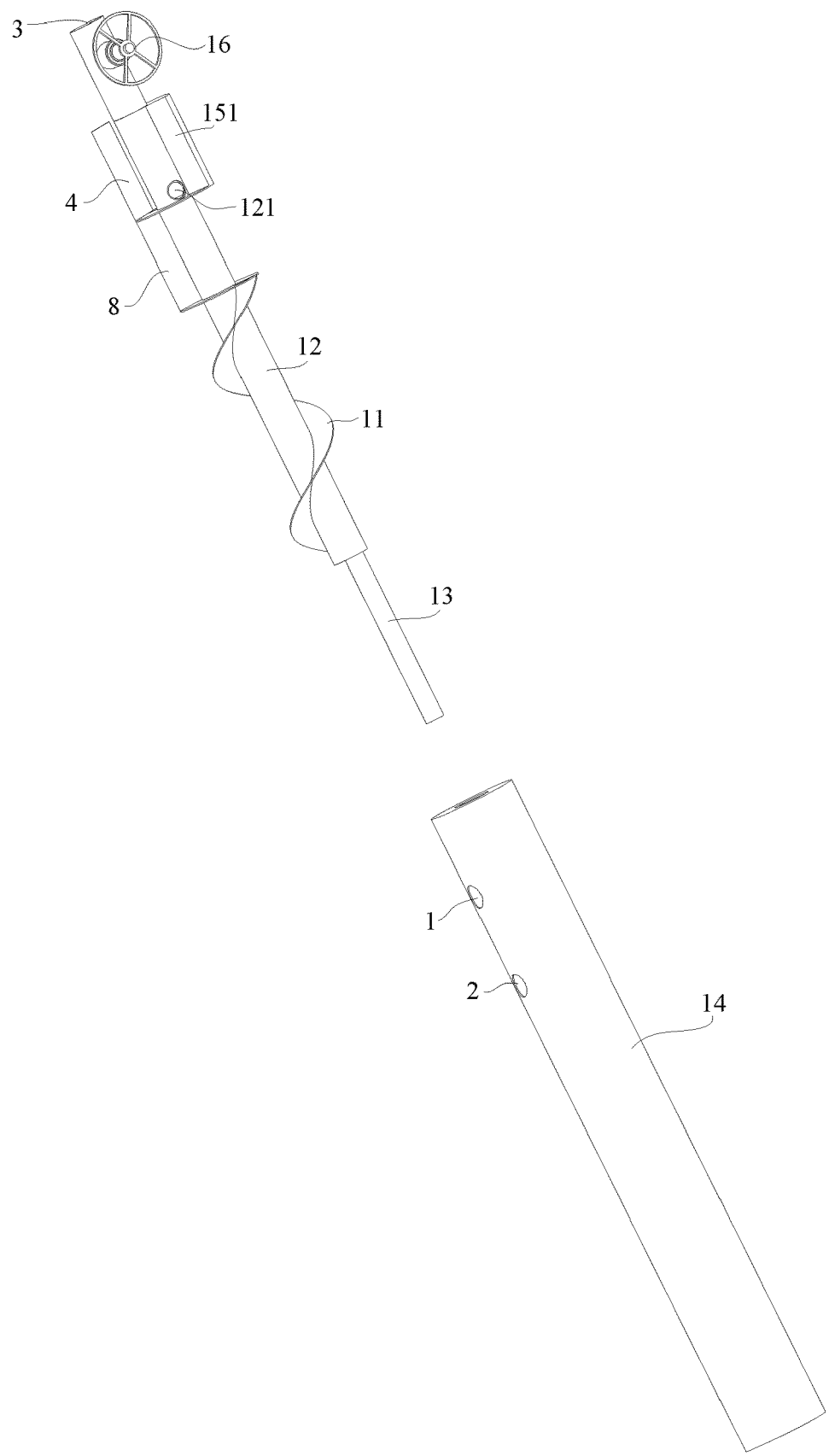
FIG. 3 is an exploded view of the gas-liquid separation device shown in FIG. 1 from another perspective.

Exemplary embodiments will be described in detail here, and examples thereof are shown in the drawings. When the following description refers to the drawings, unless otherwise indicated, the same numbers in different drawings indicate the same or similar elements. The implementation embodiments described in the following exemplary embodiments do not represent all implementation embodiments consistent with the present disclosure. On the contrary, they are merely examples of devices and methods consistent with some aspects of the present disclosure as detailed in the appended claims.

The terms used in the present disclosure are only for the purpose of describing specific embodiments, and are not intended to limit the present disclosure. The singular forms of "a", "said" and "the" described in the present disclosure and appended claims are also intended to include plural forms, unless the context clearly indicates otherwise.

It should be understood that "first", "second" and similar words used in the specification and claims of the present disclosure do not indicate any order, quantity or importance, but are only used to distinguish different components. Similarly, similar words such as "a" or "an" do not mean a quantity limit, but mean that there is at least one. Unless otherwise indicated, similar words such as "front", "rear", "lower" and/or "upper" are only for convenience of description, and are not limited to one position or one spatial orientation. Terms such as "including" or "comprising" and other similar words mean that the elements or components before "including" or "comprising" now cover the elements or components listed after "including" or "comprising" and their equivalents, and do not exclude other elements or components. The term "a plurality of" mentioned in the present disclosure include two or more.

The exemplary embodiments of the present disclosure will be described in detail below with reference to the drawings. In the case of no conflict, the following embodiments and features in the embodiments can be combined with each other.

FIG. 1 is a schematic structural view of a gas-liquid separation device 100 in accordance with an exemplary embodiment of the present disclosure. The gas-liquid separation device 100 can be applied to various refrigeration systems, and is suitable for many fields such as household air conditioners, commercial air conditioners and automotive air conditioners etc. The gas-liquid separation device can also be integrated with a heat exchanger in a refrigeration system, for example, it can be integrated with an outdoor heat exchanger of an automotive air conditioner.

Referring to FIG. 1 and in combination of FIG. 2 to FIG. 8B when necessary, the gas-liquid separation device 100 includes a cylinder 14, an external port, an adapter and a gas-liquid separation component. The cylinder 14 has a first cavity 5, a second cavity 6 and a third cavity 9. The first cavity 5 is in communication with the second cavity 6. The second cavity 6 is in communication with the third cavity 9. The external port includes a first port 1, a second port 2 and a third port 3. The first port 1 is in communication with the first cavity 5. The second port 2 is in communication with the second cavity 6. Referring to FIG. 5B, the adapter is at least partially disposed in the cylinder 14. The adapter defines a first channel 120 and a second channel 130. A lower end of the second channel 130 is lower than a lower end of the first channel 120. The second channel 130 is in communication with the first cavity 5 and the third cavity 9. The third port 3 is selectively in communication with or not in communication with the third cavity 9 through the first channel 120. The gas-liquid separation component is located in the third cavity 9. When the gas-liquid separation device is in a first working state, the first channel 120 is closed, so that the third port 3 is not in communication with the third cavity 9;

the first port 1 serves as an inlet, and the second port 2 serves as an outlet. When the gas-liquid separation device is in a second working state, the first channel 120 is opened, so that the third port 3 is in communication with the third cavity 9; the gas-liquid separation component separates a gas-liquid two-phase refrigerant; the second port 2 serves as an inlet, and the first port 1 and the third port 3 serve as outlets. Specifically, the first port 1 serves as a liquid-phase refrigerant outlet, and the third port 3 serves as a gas-phase refrigerant outlet. Of course, in other embodiments, when the gas-liquid separation device is in the second working state, the first channel 120 is opened, so that the third port 3 is in communication with the third cavity 9. The gas-liquid separation component separates the gas-liquid two-phase refrigerant. The first port 1 serves as an inlet, and the second port 2 and the third port 3 serve as outlets. Specifically, the second port 2 serves as a liquid-phase refrigerant outlet, and the third port 3 serves as a gas-phase refrigerant outlet. The first working state may be a cooling working condition of the air conditioning system. The second working state may be a heating working condition of the air conditioning system. With this arrangement, the gas-liquid separation device 100 can be applied to different working modes of a refrigeration system, such as a cooling mode, a heating mode and a defrosting mode of the air conditioning system, so that the application of the gas-liquid separation device 100 is more extensive and flexible.

Figure 5A:
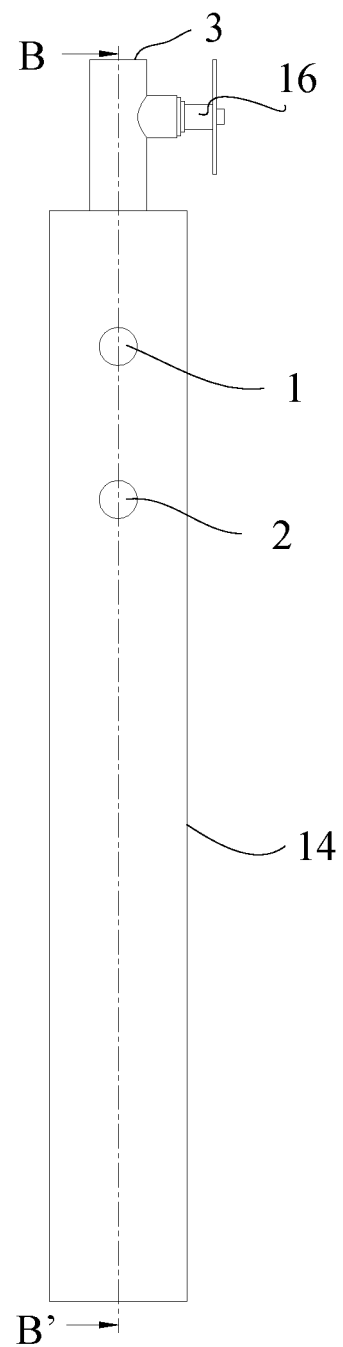
FIG. 5A is a schematic structural view of the gas-liquid separation device shown in FIG. 1 from a perspective.
Figure 5B:
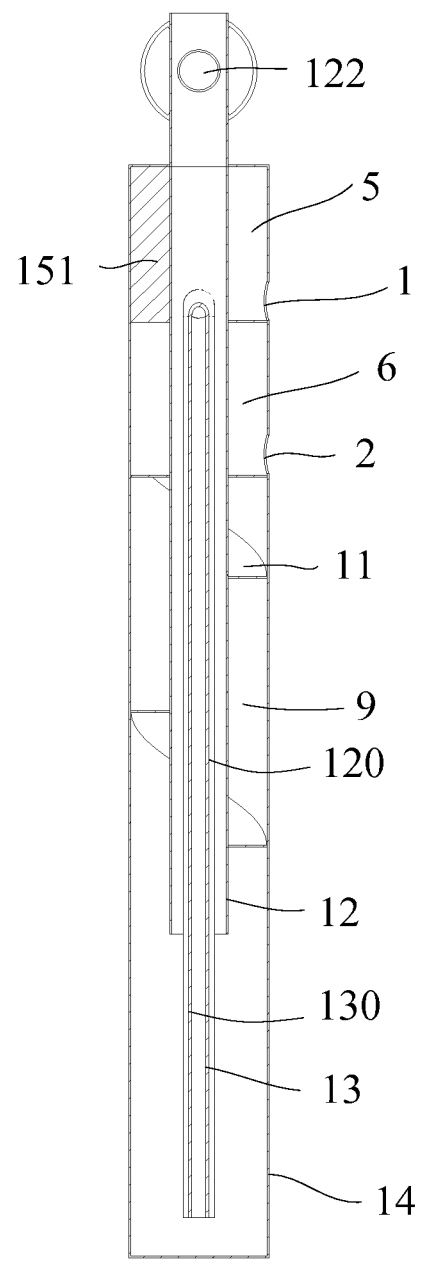
FIG. 5B is a cross-sectional view taken along B-B' in the gas-liquid separation device shown in FIG. 5A.
Figure 6A:
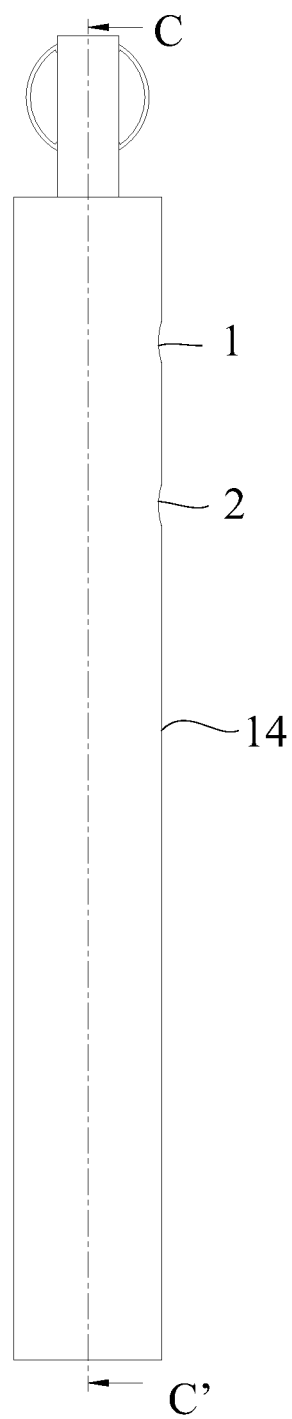
FIG. 6A is a schematic structural view of the gas-liquid separation device shown in FIG. 1 from another perspective.
Figure 6B:
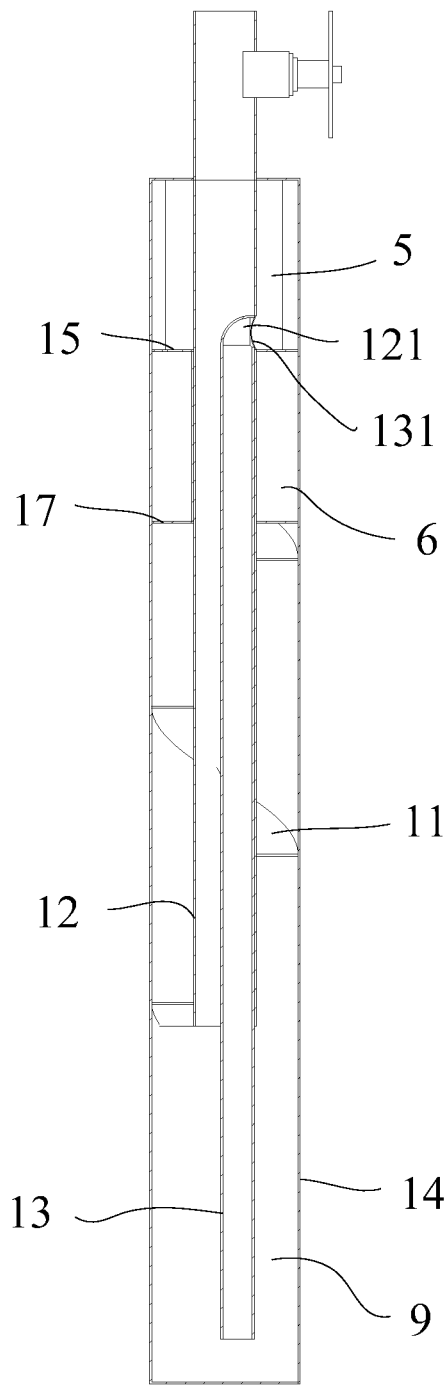
FIG. 6B is a cross-sectional view taken along C-C' in the gas-liquid separation device shown in FIG. 6A.

Further, in some embodiments, the adapter includes a first connecting pipe 12 and a second connecting pipe 13. The second connecting pipe 13 is at least partially received in and extends through the first connecting pipe 12. A cavity of the first connecting pipe 12 at least partially forms the first channel 120. A cavity of the second connecting pipe 13 at least partially forms the second channel 130. A lower end of the second channel 130 is lower than a lower end of the first channel 120. When the first channel 120 is opened, the third port 3 is in communication with the third cavity 9 through the first channel 120. When the first channel 120 is closed, the third port 3 is not in communication with the third cavity 9. Referring to FIG. 5B, in the illustrated embodiment of the present disclosure, the second connecting pipe 13 is at least partially received in and extends through the first connecting pipe 12.

Specifically, in some embodiments, an upper end of the second connecting pipe 13 is provided with a first opening 131. Correspondingly, the first connecting pipe 12 is provided with a second opening 121 corresponding to the first opening 131. The first opening 131 is located inside the second opening 121 so that the first opening 131 is in communication with the first cavity 5 through the second opening 121.

Furthermore, in some embodiments, a lower end of the first connecting pipe 12 and a lower end of the second connecting pipe 13 both extend into the third cavity 9. The lower end of the second connecting pipe 13 is lower than the lower end of the first connecting pipe 12, that is, the lower end of the second connecting pipe 13 extends downwardly beyond the lower end of the first connecting pipe 12. As a result, the second connecting pipe 13 and the first connecting pipe 12 can circulate the refrigerant in different states at the same time.

The inventor(s) obtained through a large number of experiments that, in some embodiments, when a distance between the lower end of the second connecting pipe 13 and a bottom of the cylinder 14 is 10 mm to 20 mm, the working performance of the gas-liquid separation device can be better improved.

In some alternative embodiments, a cross section of the second connecting pipe 13 is circular. The inventor(s) have obtained through a large number of experiments that, in some embodiments, when a diameter of the second connecting pipe 13 ranges from 5 mm to 15 mm, the working performance of the gas-liquid separation device can be better improved. Of course, in some other embodiments, the cross section of the second connecting pipe 13 may also have other shapes, such as a rectangle, an ellipse, etc., which is not limited in the present disclosure, and can be set according to a specific application environment.

Of course, a cross section of the first connecting pipe 12 can also be circular, rectangular, elliptical, etc., which is not limited in the present disclosure, and can be set according to a specific application environment.

Figure 7A:
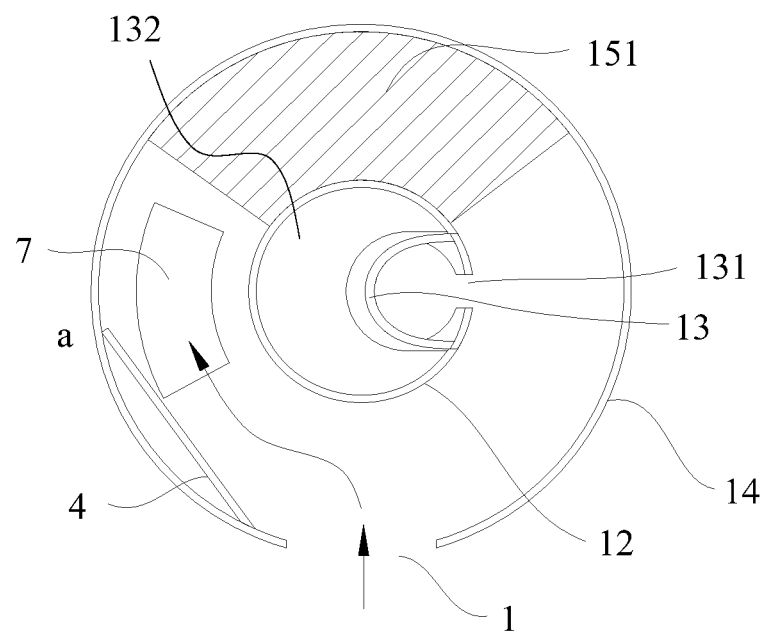
FIG. 7A is a cross-sectional view of the gas-liquid separation device at a first cavity in accordance with an exemplary embodiment of the present disclosure.
Figure 7B:
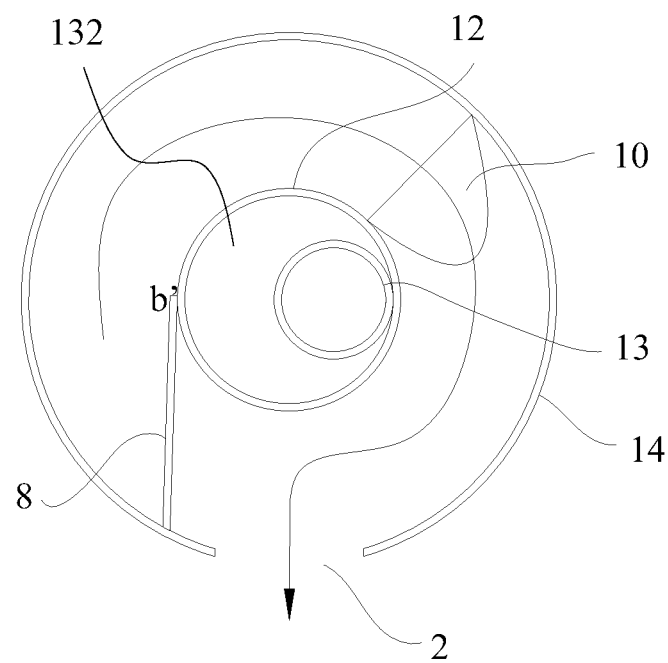
FIG. 7B is a cross-sectional view of the gas-liquid separation device at a second cavity in accordance with an exemplary embodiment of the present disclosure.

Referring to FIG. 7A and FIG. 7B, in the illustrated embodiment of the present disclosure, the cross-sections of the first connecting pipe 12 and the second connecting pipe 13 are both circular. The first connecting pipe 12 and the second connecting pipe 13 are disposed eccentrically, that is, a central axis of the first connecting pipe 12 and a central axis of the second connecting pipe 13 do not overlap. This arrangement, on one hand, is beneficial to the alignment of the first opening 131 and the second opening 121; on the other hand, it is beneficial to the formation of a larger overall space 132 between the first connecting pipe 12 and the second connecting pipe 13, thereby facilitating the flow of gas-phase refrigerant. Refer to FIG. 7B, in the illustrated embodiment of the present disclosure, an outer wall of the second connecting pipe 13 abuts against an inner wall of the first connecting pipe 12 so as to facilitate the positioning of the second connecting pipe 13.

In some embodiments, the gas-liquid separation component is a spiral blade 11 surrounding an outer wall of the adapter.

Furthermore, in some embodiments, an outer ring of the spiral blade 11 abuts against the inner wall of the cylinder 14, an inner ring of the spiral blade abuts against the outer wall of the first connecting pipe 12, and a spiral channel is formed between the inner wall of the cylinder 14 and the outer wall of the first connecting pipe 12, thereby facilitating the lengthening of the fluid flow channel, so as to better realize the gas-liquid separation of the refrigerant.

The inventor(s) have obtained through a large number of experiments that, in some embodiments, when the number of turns of the spiral blade 11 is 1 to 2, the gas-liquid separation device 100 has a better gas-liquid separation effect.

Furthermore, in some embodiments, the second cavity 6 is located under the first cavity 5, the third cavity 9 is located under the second cavity 6, and the third port 3 is disposed at the upper end of the first connecting pipe 12. In some embodiments, the upper end of the first connecting pipe 12 extends beyond the cylinder 14, and correspondingly, the third port 3 is disposed outside the cylinder 14.

Furthermore, in some embodiments, a first passage 7 is provided between the first cavity 5 and the second cavity 6, that is, the refrigerant can circulate between the first cavity 5 and the second cavity 6 through the first passage 7. A second passage 10 is provided between the second cavity 6 and the third cavity 9, that is, the refrigerant can circulate between the second cavity 6 and the third cavity 9 through the second passage 10. In some alternative embodiments, the first passage 7 and the second passage 10 are disposed on different sides, that is, the first passage 7 and the second passage 10 are not aligned in a top-to-bottom direction, which is beneficial to increase the flow distance of the refrigerant.

Specifically, in an alternative embodiment, a first spacer 15 and a second spacer 17 are provided between the adapter and the inner wall of the cylinder 14. The first spacer 15 includes a ring-shaped first partition 152, and a partition block 151 disposed on the first partition 152 and extending in a longitudinal direction (for example, a top-to-bottom direction). A first through hole 1521 is provided in the middle of the ring-shaped first partition 152 so as to set an adapter (for example, the first connecting pipe 12). Referring to FIG. 5B, an inner wall of the partition block 151 abuts against the outer wall of the first connecting pipe 12. An outer wall of the partition block 151 abuts against the inner wall of the cylinder 14. The partition block 151 is disposed so that the first cavity 5 cannot penetrate the outer side of the adapter in a circumferential direction. That is, the first cavity 5 is disposed around a peripheral side of the adapter but cannot completely surround the peripheral side of the adapter, and a part of the first cavity is blocked by the partition block 151. The first partition 152 is located between the first cavity 5 and the second cavity 6 so as to separate the first cavity 5 and the second cavity 6.

Correspondingly, the above-mentioned first passage 7 may be a through hole provided on the first partition 152. The second partition 17 is an annular second partition. The second spacer 17 is disposed between the second cavity 6 and the third cavity 9 so as to separate the second cavity 6 and the third cavity 9. A second through hole 171 is provided in the middle of the second spacer 17 to set an adapter (such as the first connecting pipe 12). Correspondingly, the above-mentioned second passage 10 may be a through hole provided on the second spacer 17.

In some embodiments, the first port 1 and the second port 2 are directly opened on the wall of the cylinder 14. Corresponding to the positions of the first cavity 5 and the second cavity 6 along the top-to-bottom direction, the first port 1 is located above the second port 2. Alternatively, both of the first port 1 and the second port 2 are disposed on the same side of the cylinder wall of the cylinder 14 so as to facilitate the connection of pipes and the like into to the first port 1 and the second port 2. The same side mentioned here can be understood as the first port 1 is provided directly above the second port 2. It should be understood that tolerances caused by process and other reasons are also within this protection scope. Of course, in some other embodiments, the first port 1 may not be disposed directly above the second port 2. The present disclosure does not limit this, and it can be set according to the specific environment. In addition, the first port 1 and the second port 2 may not be directly disposed at the cylinder wall, but are connected to the outside of the cylinder 14 through other pipe fittings and other equipment.

Furthermore, the adapter has a switch 16 for controlling the communication or discommunication between the third port 3 and the third cavity 9.

Figure 4:
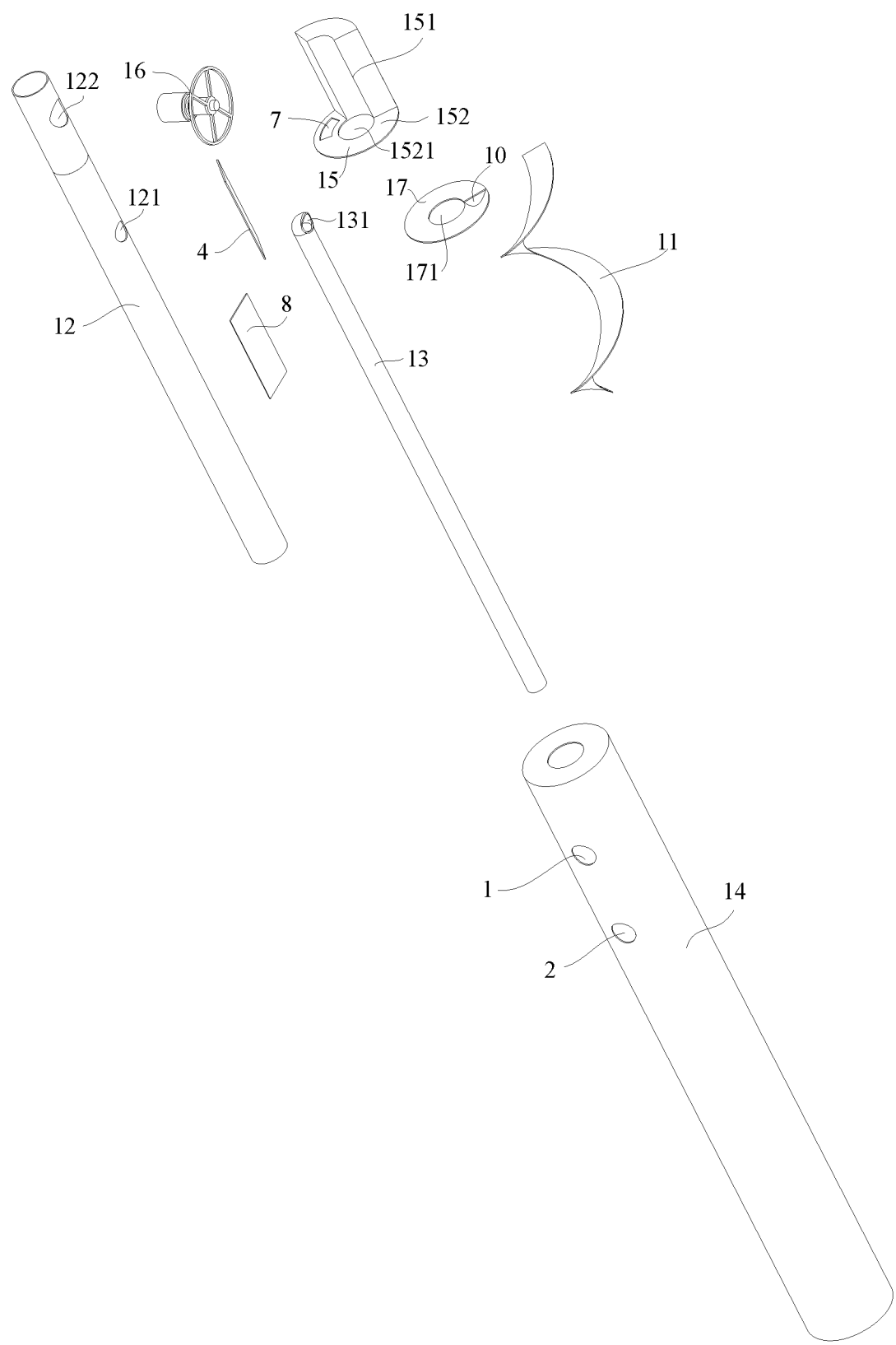
FIG. 4 is another exploded view of the gas-liquid separation device shown in FIG. 1.

In some embodiments, the switch 16 may be an external valve disposed at the first connecting pipe 12 and adjacent to the third port 3. With reference to FIGS. 4 and 5B, the side wall of the upper part of the first connecting pipe 12 adjacent to the third port 3 is provided with an opening 122 for installing the external valve.

Specifically, the switch 16 is a valve element that is controlled to open or close a valve body channel by an electric signal. The valve body channel of the switch 16 forms at least a part of the first channel 120. When the valve body channel is in an open state, the first channel 120 is in communication with the third port 3 and the third cavity 9. When the valve body channel is in a closed state, the third port 3 is not in communication with the third cavity 9, and the switch 16 is at least partially located outside the cylinder 14.

Figure 8A:
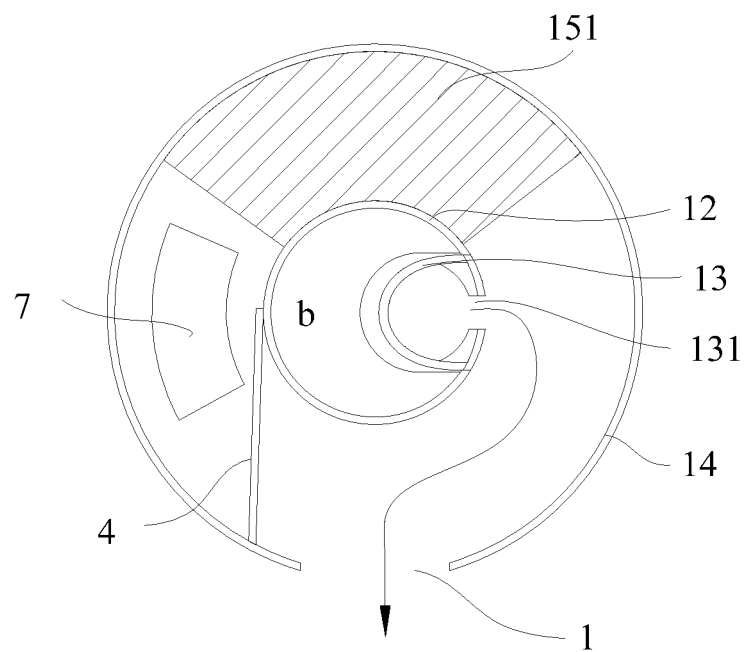
FIG. 8A is a cross-sectional view of the gas-liquid separation device at the first cavity in accordance with another exemplary embodiment of the present disclosure.
Figure 8B:
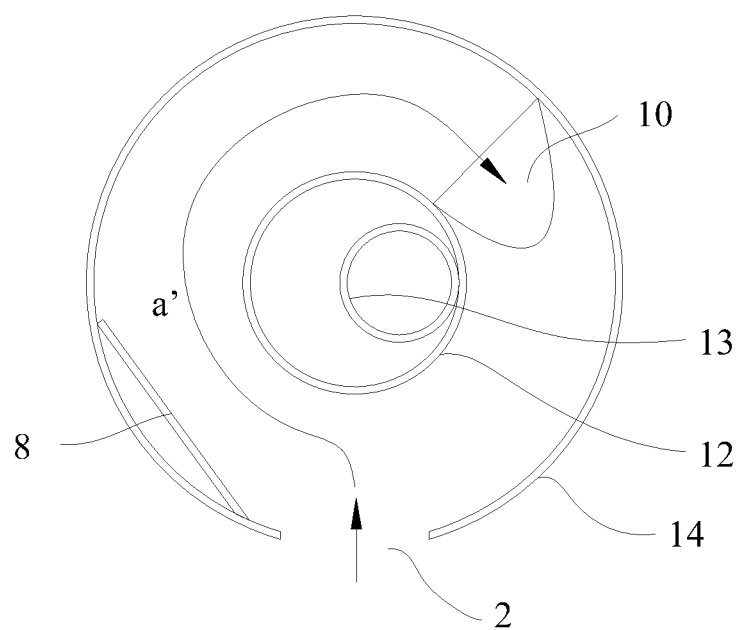
FIG. 8B is a cross-sectional view of the gas-liquid separation device at the second cavity in accordance with another exemplary embodiment of the present disclosure.

Furthermore, in some embodiments, a first opening and closing door 4 disposed in the first cavity 5 extends along the top-to-bottom direction and is rotatable. It can be used to control the communication status between the first passage 7 and the first port 1 by opening and closing of the first opening and closing door 4. Referring to FIG. 7A, when the first opening and closing door 4 is opened, the first port 1 is in communication with the first opening 131, and the first port 1 is in communication with the first passage 7 as well. Referring to FIG. 8A, when the first opening and closing door 4 is closed, the first opening 131 and the first port 1 are located on the same side of the first opening and closing door 4, the first port 1 and the first passage 7 are not in communication, and the first opening 131 is not in communication with the first passage 7. Referring to FIGS. 7A, 7B and 5B, in the first working state, the switch 16 separates the third port 3 and the third cavity 9; the first opening and closing door 4 is opened, the first cavity 5 and the second cavity 6 are in communication through the first passage 7. Referring to FIGS. 8A, 8B and 5B, in the second working state, the switch 16 is in communication with the third port 3 and the third cavity 9; and when the second port 2 serves as an inlet, the first port 1 and the third port 3 serves as outlets, the first opening and closing door 4 is closed. As a result, the first connecting pipe 12 is in communication with the third port 3 and the third cavity 9, and the second connecting pipe 13 is in communication with the third cavity 9 and the first cavity 5.

Furthermore, in some embodiments, a second opening and closing door 8 disposed in the second cavity 6 extends along the top-to-bottom direction and is rotatable. The opening and closing of the second opening and closing door 8 can be used to increase the distance of the refrigerant flowing in the second cavity 6. When the second opening and closing door 8 is opened, a flow channel that through a position, where the second opening and closing door 8 is located in the open state, is formed between the second port 2 and the second passage 10. When the second opening and closing door 8 is closed, a flow channel, which bypasses the position where the second opening and closing door 8 is located in the closed state, is formed between the first passage 7 and the second port 2.

In the second working state, the first opening and closing door 4 is opened, and the second opening and closing door 8 is closed. In the second working state, and when the second port 2 serves as an inlet, and the first port 1 and the third port 3 serve as outlets, the first opening and closing door 4 is closed, and the second opening and closing door 8 is opened.

In some alternative embodiments, the second opening and closing door 8 is located directly below the first opening and closing door 4. Similarly, tolerances due to craftsmanship and other reasons should be understood to also fall within this protection scope. Of course, in some other embodiments, the second opening and closing door 8 may not be disposed directly below the first opening and closing door 4, which is not limited in the present disclosure, and can be set according to a specific environment.

Referring to FIGS. 7A and 7B, in the above-mentioned gas-liquid separation device 100 in the first working state (the cooling working condition), the first port 1 is an inlet, the second port 2 is an outlet, and the third port 3 is closed by the external valve 16. At this time, the refrigerant (usually a gas-liquid two-phase or liquid-phase refrigerant, which may come out of a certain process of the heat exchanger) enters the gas-liquid separation device 100 through the first port 1. The flow of the refrigerant can push open the first opening and closing door 4 and rotate it to a position a (see FIG. 7A), so that the refrigerant enters the first cavity 5, and then the refrigerant enters the second cavity 6 through the first passage 7 located between the first cavity 5 and the second cavity 6. Due to the pressure difference, the refrigerant pushes the second opening and closing door 8 to a position b' (see FIG. 7B). After that, the refrigerant roughly wraps around the outer circumference of the first connecting pipe 12 and then flows out through the second port 2. For the gas-liquid separation device integrated with the heat exchanger, the outflowing refrigerant can enter the next process of the heat exchanger.

Referring to FIGS. 5A to 6B, and FIGS. 8A and 8B, the above-mentioned gas-liquid separation device 100 includes two embodiments in the second working state (the heating working condition). In a first embodiment, the second port 2 is an inlet, the first port 1 is an outlet of liquid-phase refrigerant, and the third port 3 is an outlet of gas-phase refrigerant and is opened by the external valve 16. In a second embodiment, the first port 1 is an inlet, the second port 2 is an outlet of the liquid-phase refrigerant or an outlet of the gas-liquid two-phase refrigerant, and the third port 3 is an outlet for the gas-phase refrigerant and is opened by the external valve 16. In the first embodiment, the refrigerant (generally a gas-liquid two-phase refrigerant, or a gas-phase refrigerant, and the refrigerant may also come out of a certain process of the heat exchanger) enters the gas-liquid separation device 100 through the second port 2, and then pushes and opens the second opening and closing door 8 to a position a' (see FIG. 8B), so that the refrigerant enters the second cavity 6. Part of the refrigerant enters the first cavity 5 through the first passage 7 between the first cavity 5 and the second cavity 6. Due to the pressure difference, the refrigerant pushes the first opening and closing door 4 to a position b (see FIG. 8A), so that the space in the first cavity 5 directly in communication with the first passage 7 is a no-flow space ("dead zone") so as to prevent the refrigerant flowing out of the first passage 7 from flowing out of the first port 1. At this time, the refrigerant roughly wraps around the outer circumference of the first connecting pipe 12, and then enters the third cavity 9 through the second passage 10 between the second cavity 6 and the third cavity 9, and then flows downwardly along the spiral channel formed by the spiral blade 11 in the third cavity 9, so that the refrigerant realizes gas-liquid separation under the action of centrifugal force. The separated gas-phase refrigerant in the third cavity 9 flows upwardly through the channel inside the first connecting pipe 12, and finally flows out through the third port 3. In some embodiments, the refrigerant flowing out of the third port 3 may be further delivered to the outlet of the heat exchanger. The separated liquid-phase refrigerant in the third cavity 9 is located in the lower part of the cylinder 14, then flows upwardly through the channel inside the second connecting pipe 13 so as to enter the first cavity 5, and then flows out through the first port 1. In some embodiments, the refrigerant flowing out of the first port can enter the next process of the heat exchanger. The flow direction of the refrigerant in the second working state (the heating working condition) is opposite to that in the first working state (the cooling working condition), and the inlet and outlet can be reversed. It can realize the gas-liquid separation in the intermediate process of the heat exchanger, allowing more liquid-phase refrigerant to enter the heat exchanger to evaporate, thereby increasing the heating capacity of the system.

In the second embodiment, the refrigerant (generally a gas-liquid two-phase refrigerant or a gas-phase refrigerant, and the refrigerant may also come out of a certain process of the heat exchanger) enters the gas-liquid separation device 100 through the first port 1, and then pushes and opens the first opening and closing door 4 to rotate it to the position a (see FIG. 7A), so that the refrigerant enters the first cavity 5. Part of the refrigerant enters the second cavity 6 through the first passage 7 between the first cavity 5 and the second cavity 6. Part of the refrigerant enters the third cavity 9 through the first opening 131 at the upper end of the second connecting pipe 13. Due to the pressure difference, the refrigerant that entering the second cavity 6 from the first passage 7 pushes the second opening and closing door 8 to the position b' (see FIG. 7B). After that, part of the liquid-phase refrigerant or gas-liquid two-phase refrigerant that enters the second cavity 6 flows out through the second port 2. Another part of the refrigerant entering the second cavity 6 flows into the third cavity 9 through the second passage 10. The two refrigerants entering the third cavity 9 are balanced according to the pressure in the respective flow paths. Finally, the gas-phase refrigerant separated in the third cavity 9 flows upwardly through the channel inside the first connecting pipe 12 and flows out through the third port 3. In the second embodiment, in the second working state (the heating working condition), the first port 1 is set as the inlet, and the second port 2 and the third port 3 are set as the outlets, which can also achieve the effect of one inlet and two outlets.

In addition, the present disclosure also provides a refrigeration system. In partial schematic views of the refrigeration system shown in FIGS. 9 and 10, in the refrigeration system, the gas-liquid separation device 100 is integrated in a heat exchanger 200. The heat exchanger 200 includes two relatively independent heat exchange units 201 and 202. The first port 1 and the second port 2 of the gas-liquid separation device 100 are integrated with the heat exchanger 200 through a multi-way valve 300. Solid lines in the multi-way valve 300 indicate parts of the pipelines through which the multi-way valve 300 is communicated, that is, the pipelines through which the refrigerant can circulate; while dashed lines indicate parts of the pipelines through which the multi-way valve 300 is not communicated, that is, the pipelines through which the refrigerant can not circulate.

Figure 9:
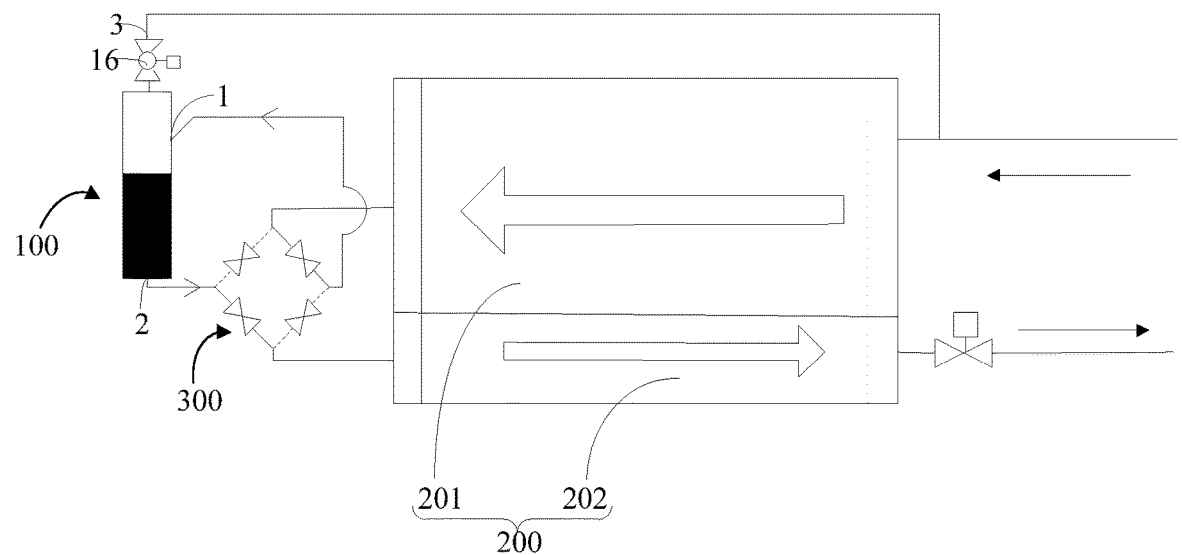
FIG. 9 is a partial schematic view of a refrigeration system in accordance with an exemplary embodiment of the present disclosure working under a working condition.
Figure 10:
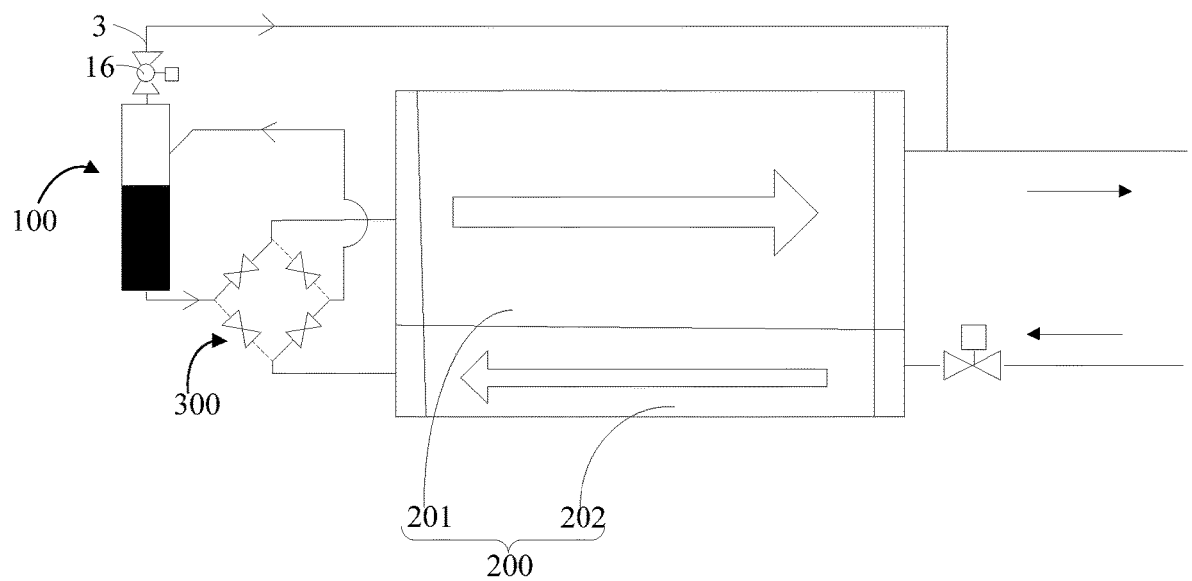
FIG. 10 is a partial schematic view of the refrigeration system in accordance with an exemplary embodiment of the present disclosure working under another working condition.

FIG. 9 illustrates a partial schematic view of the refrigeration system working under a first working condition. The first working condition can be understood as a cooling working condition, a defrosting working condition and other working conditions. Correspondingly, the gas-liquid separation device 100 is in the first working state. FIG. 10 illustrates a partial schematic view of the refrigeration system working under a second working condition. The second working condition can be understood as a heating working condition and other working conditions. Correspondingly, the gas-liquid separation device 100 is in the second working state.

The gas-liquid separation device 100, when integrated into the heat exchanger 200, can realize gas-liquid separation in the intermediate process of the heat exchanger under the second working condition of the refrigeration system. The gaseous refrigerant after the heat exchange by the heat exchange unit 201, and the gaseous refrigerant separated by the gas-liquid separation device 100 and flowing out through the third port 3 can enter a next device of the refrigeration system together. As a result, this allows more refrigerant in the refrigeration system, increases the heating capacity of the system, and thus improves the heat exchange efficiency of the air conditioning system.

The inventor(s) found that when the gas-liquid separation device 100 described in the above embodiment is applied to a refrigeration system, its heating capacity is significantly increased. For example, the inventor(s) have found through a large number of experiments that when working at −20° C., the heating capacity can be increased by 35%. In addition, the refrigeration system using the gas-liquid separation device 100 does not need to use a supplemental gas enthalpy cycle to achieve a good improvement in system performance.

The above are only preferred embodiments of the present disclosure, and do not limit the present disclosure in any form. Although the present disclosure has been disclosed as above in preferred embodiments, it is not intended to limit the present disclosure. Those of ordinary skill in the art, without departing from the scope of the technical solution disclosed in this disclosure, can use the technical content disclosed above to make some changes or modifications into equivalent embodiments with equivalent changes. However, without departing from the content of the technical solution of the present disclosure, any simple modifications, equivalent changes and modifications made to the above embodiments based on the technical essence of the present disclosure still fall within the scope of the technical solutions of the present disclosure.

What is claimed is:
1. A gas-liquid separation device, comprising:
a cylinder, the cylinder defining a first cavity, a second cavity and a third cavity, the first cavity being in communication with the second cavity, the second cavity being in communication with the third cavity;
an external port, the external port comprising a first port, a second port and a third port, the first port being in communication with the first cavity, the second port being in communication with the second cavity;
an adapter, the adapter being at least partially disposed in the cylinder, the adapter defining a first channel and a second channel, a lower end of the second channel and a lower end of the first channel being both located in the third cavity, the lower end of the second channel being lower than the lower end of the first channel, the second channel being in communication with the first cavity and the third cavity; and
a gas-liquid separation component, the gas-liquid separation component being located in the third cavity, and being adapted to separate a gas-liquid two-phase refrigerant that enters the third cavity from the second cavity;
wherein when the gas-liquid separation device is in a first working state, the first channel is closed so that the third port is not in communication with the third cavity; the first port serves as an inlet, and the second port serves as an outlet;
when the gas-liquid separation device is in a second working state, the first channel is opened so that the third port is in communication with the third cavity; the second port serves as an inlet, the first port being in communication with the second channel serves as an outlet for a liquid-phase refrigerant after being separated from the gas-liquid two-phase refrigerant, and the third port being in communication with the first channel serves as an outlet of a gas-phase refrigerant after being separated from the gas-liquid two-phase refrigerant; or, the first port serves as an inlet, the second port serves as an outlet for the liquid-phase refrigerant or an outlet for the gas-liquid two-phase refrigerant, and the third port being in communication with the first channel serves as an outlet for the gas-phase refrigerant after being separated from the gas-liquid two-phase refrigerant.

2. The gas-liquid separation device according to claim 1, wherein the adapter comprises a first connecting pipe and a second connecting pipe, the second connecting pipe is partially received in and extends through the first connecting pipe, a cavity of the first connecting pipe at least partially forms the first channel and a cavity of the second connecting pipe at least partially forms the second channel.

3. The gas-liquid separation device according to claim 2, wherein the second cavity is located below the first cavity, the third cavity is located below the second cavity, an upper end of the first connecting pipe extends into the first cavity along a direction away from the third cavity, and the third port is located at the upper end of the first connecting pipe.

4. The gas-liquid separation device according to claim 2, wherein the gas-liquid separation component is a spiral blade surrounding an outer wall of the adapter.

5. The gas-liquid separation device according to claim 4, wherein an outer ring of the spiral blade abuts against an inner wall of the cylinder and an inner ring of the spiral blade abuts against an outer wall of the first connecting pipe so that a spiral channel is formed between the inner wall of the cylinder and the outer wall of the first connecting pipe for the refrigerant to flow.

6. The gas-liquid separation device according to claim 2, wherein the second connecting pipe and the first connecting pipe are disposed eccentrically.

7. The gas-liquid separation device according to claim 1, wherein a first passage is provided between the first cavity and the second cavity, and a second passage is provided between the second cavity and the third cavity.

8. The gas-liquid separation device according to claim 7, wherein the adapter comprises a switch which controls communication or discommunication between the third port and the third cavity.

9. The gas-liquid separation device according to claim 8, wherein the switch is a valve element which is controlled to open or close a valve body channel by an electric signal, the valve body channel forms at least part of the first channel; when the valve body channel is in an open state, the first channel is in communication with the third port and the third cavity; and when the valve body channel is in a closed state, the third port is not in communication with the third cavity, and the switch is at least partially located outside the cylinder.

10. The gas-liquid separation device according to claim 8, wherein a first opening and closing door, which extends along a top-to-bottom direction and is rotatable, is provided in the first cavity, the first opening and closing door has an open state and a closed state; when the first opening and closing door is opened, the first port and the first passage are in communication through the first cavity; when the first opening and closing door is closed, the first port and the first passage are separated by the first opening and closing door;
in the first working state, the switch separates the third port from the third cavity; the first opening and closing door is opened, and the first cavity is in communication with the second port;
in the second working state, the switch communicates with the third port and the third cavity; and the second port serves as an inlet, the first port and the third port serve as outlets; the first opening and closing door is closed to prevent the refrigerant flowing from the first passage to the first cavity from flowing out of the first port;
the second cavity and the third cavity are communicated through the second passage, so that the refrigerant entering the second cavity from the second port flows to the third cavity through the second passage;
the first connecting pipe communicates with the third cavity and the third port, so that the gas-phase refrigerant after being separated can flow out of the third port through the first channel; and
the second connecting pipe communicates with the third cavity and the first cavity, so that the liquid-phase refrigerant after being separated can flow out of the first port through the second channel.

11. The gas-liquid separation device according to claim 10, wherein a second opening and closing door, which extends along the top-to-bottom direction and is rotatable, is provided in the second cavity; the second opening and closing door has an open state and a closed state; when the second opening and closing door is opened, a flow channel through a position, where the second opening and closing door is located in the closed state, is formed between the second port and the second passage; when the second opening and closing door is closed, a flow channel bypassing a position, where the second opening and closing door is located in the closed state, is formed between the first passage and the second port;
in the first working state, the first opening and closing door is opened, and the second opening and closing door is closed; and in the second working state, the first opening and closing door is closed, and the second opening and closing door is opened.

12. The gas-liquid separation device according to claim 8, wherein a first opening and closing door, which extends along a top-to-bottom direction and is rotatable, is provided in the first cavity; when the first opening and closing door is opened, the first port and the first passage are communicated through the first cavity;
in the first working state, the switch separates the third port from the third cavity; the first opening and closing door is opened, the first cavity is in communication with the second port;
in the second working state, the switch communicates with the third port and the third cavity; and the first port serves as an inlet, the second port and the third port serves as outlets;
the first opening and closing door is opened, the first cavity and the second cavity are communicated through the first passage, so that the refrigerant entering the first cavity from the first port flows to the second cavity through the first passage;
at least part of the refrigerant entering the second cavity flows to the third cavity through the second passage;
the first connecting pipe communicates the third cavity with the third port, so that the gas-phase refrigerant after being separated can pass through the first channel and flow out from the third port.

13. The gas-liquid separation device according to claim 12, wherein a second opening and closing door, which extends along the top-to-bottom direction and is rotatable, is provided in the second cavity; when the second opening and closing door is closed, a flow channel bypassing a position, where the second opening and closing door is located in the closed state, is formed between the first passage and the second port;
in the first working state, the first opening and closing door is opened, and the second opening and closing door is closed; and in the second working state, the first opening and closing door is opened, and the second opening and closing door is closed.

14. The gas-liquid separation device according to claim 7, wherein the gas-liquid separation device further comprises a first spacer and a second spacer which are located between an outer wall of the first connecting pipe and an inner wall of the cylinder;
wherein the first spacer comprises an annular first partition defining a first through hole for setting the first connecting pipe, the first through hole is located in a middle of the first partition, the first partition is located between the first cavity and the second cavity, and the first passage is a through hole provided in the first partition;
the second partition is a ring-shaped second partition, a second through hole for setting the first connecting pipe is provided in a middle of the second spacer, the second spacer is located between the second cavity and the third cavity, and the second passage is a through hole provided in the second spacer.

15. The gas-liquid separation device according to claim 14, wherein the first passage and the second passage are not aligned along a top-to-bottom direction.

16. The gas-liquid separation device according to claim 14, wherein the first spacer comprises a partition block located in the first cavity, an inner wall of the partition block abuts against an outer wall of the first connecting pipe, and an outer wall of the partition block abuts against an inner wall of the cylinder, so that the first cavity cannot circumferentially communicates along an outer side of the first connecting pipe.

17. A gas-liquid separation device, comprising:
a cylinder defining a first cavity, a second cavity, a third cavity, a first port, and a second port, the first port communicated with the first cavity, the second port communicated with the second cavity, the first cavity communicated with the second cavity, the second cavity communicated with the third cavity;
a first connecting pipe comprising an inner portion disposed in the cylinder and an outer portion extending out of the cylinder, the first connecting pipe defining a first channel, the outer portion defining a third port, a lower end of the first connecting pipe located in the third cavity;
a switch disposed on the first connecting pipe, the switch controlling a communication state between the third port and the third cavity;
a second connecting pipe at least partially disposed in the first channel, the second connecting pipe defining a second channel, the second channel communicated with the first cavity and the third cavity; and
a gas-liquid separation component located in the third cavity, the gas-liquid separation component disposed between an outer wall of the first connecting pipe and an inner wall of the cylinder;
wherein the gas-liquid separation device has a first working state and a second working state, when the gas-liquid separation device is in the first working state, the third port is not in communication with the third cavity, one of the first port and the second port serves as a refrigerant inlet, and the other one of the first port and the second port serves as a refrigerant outlet;
when the gas-liquid separation device is in the second working state, the third port is in communication with the third cavity through the first channel, one of the first port, the second port and the third port serves as a refrigerant inlet, and the other two of the first port, the second port and the third port serve as refrigerant outlets.

18. The gas-liquid separation device according to claim 17, wherein the cylinder extending along a top-to-bottom direction has a top wall adjacent to the third port and a bottom wall far away from the third port, the second connecting pipe extends from the first channel and extends out of the first connecting pipe, and a bottom of the second connecting pipe is located below a bottom of the first connecting pipe.

19. The gas-liquid separation device according to claim 17, wherein the gas-liquid separation component is a spiral blade surrounding the outer wall of the first connecting pipe.

20. The gas-liquid separation device according to claim 17, wherein the switch is a valve element which is controlled to open or close a valve body channel by an electric signal, and the valve body channel forms at least part of the first channel.

* * * * *